US012565117B2

(12) United States Patent (10) Patent No.: US 12,565,117 B2
Tseng et al. (45) Date of Patent: Mar. 3, 2026

(54) ELECTRIC VEHICLE CHARGING RECOMMENDATION SYSTEMS AND METHODS

(71) Applicant: Ford Global Technologies, LLC, Dearborn, MI (US)

(72) Inventors: Fling Finn Tseng, Ann Arbor, MI (US); Himanshu Verma, Farmington Hills, MI (US); Kwaku O. Prakah-Asante, Commerce Township, MI (US); Swati Johar Rawat, Brampton (CA); Bhagyashri Satyabodha Katti, Novi, MI (US)

( * ) Notice: Subject to any disclaimer, the term of this patent is extended or adjusted under 35 U.S.C. 154(b) by 265 days.

(21) Appl. No.: 18/333,538

(22) Filed: Jun. 13, 2023

(65) Prior Publication Data

US 2024/0416794 A1     Dec. 19, 2024

(51) Int. Cl.
*B60L 58/12* (2019.01)
*G01C 21/34* (2006.01)

(52) U.S. Cl.
CPC .......... *B60L 58/12* (2019.02); *G01C 21/3469* (2013.01); *B60L 2240/54* (2013.01); *B60L 2240/60* (2013.01)

(58) Field of Classification Search
CPC .. B60L 58/12; B60L 2240/54; B60L 2240/60; G01C 21/3469
USPC .......................................................... 701/22
See application file for complete search history.

(56) References Cited

U.S. PATENT DOCUMENTS

| | | | |
|---|---|---|---|
| 9,851,213 B2 | 12/2017 | Oh et al. | |
| 10,718,630 B2 | 7/2020 | Rahbari Asr et al. | |
| 2009/0114463 A1 | 5/2009 | DeVault | |
| 2012/0253892 A1* | 10/2012 | Davidson | G06Q 10/0631 705/7.42 |
| 2020/0226850 A1* | 7/2020 | Bower | B60Q 9/00 |
| 2022/0055496 A1 | 2/2022 | Barber et al. | |
| 2024/0025291 A1* | 1/2024 | Jang | B60L 58/16 |

OTHER PUBLICATIONS

Ford, Ford F-150 Lightning EV's Software Estimates Range Accurately, HT Auto, May 7, 2022.
Rafael Basso, Electric Vehicle Routing Problem With Machine Learning For Energy Prediction, Elsevier, Transportation Research Part B 145, Jan. 22, 2021, 24-55.

* cited by examiner

*Primary Examiner* — Adam D Tissot
(74) *Attorney, Agent, or Firm* — Emily Campbell; Eversheds Sutherland (US) LLP

(57) ABSTRACT

An electric vehicle charging recommendation method is disclosed. The method may include obtaining a vehicle information associated with a vehicle, a driver information, and a vehicle trip information. The vehicle information may include a current state of charge (SOC) of a vehicle battery. The method may further include determining a distance to be travelled by the vehicle from a vehicle current location based on the vehicle trip information. The method may further include determining an expected SOC required to travel the distance from the vehicle current location based on the vehicle information, the driver information and the vehicle trip information. The method may additionally include transmitting a recommendation notification to a user device to charge the vehicle battery when the expected SOC may be greater than the current SOC.

18 Claims, 6 Drawing Sheets

600

602 — Start

604 — Obtain a first input, a second input, and a third input

606 — Determine a distance to be travelled by a vehicle

608 — Determine an expected SOC required to travel the distance

610 — Transmit a recommendation notification to a user device

612 — Stop

ELECTRIC VEHICLE CHARGING RECOMMENDATION SYSTEMS AND METHODS

FIELD

The present disclosure relates to electric vehicle charging recommendation system and method and more particularly to system and method to minimize charging time and to enable a retail or a commercial vehicle driver to complete a vehicle trip without unplanned charging stoppages.

BACKGROUND

An Electric Vehicle (EV) operates on electric energy, and a vehicle user may charge the vehicle battery regularly to ensure uninterrupted vehicle operation. For example, the user may charge the vehicle battery multiple times when the user drives the vehicle on a long trip. In some instances, the user may have to make unplanned charging stoppages during the trip when battery charging is not scheduled while planning the trip. This may cause inconvenience to the user.

Further, a commercial vehicle driver typically traverses a predefined distance or clock a predefined drive time in a shift. Unplanned charging stoppages may affect a driver's driving schedule and may result in loss of time and resources for commercial vehicle fleet operators.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
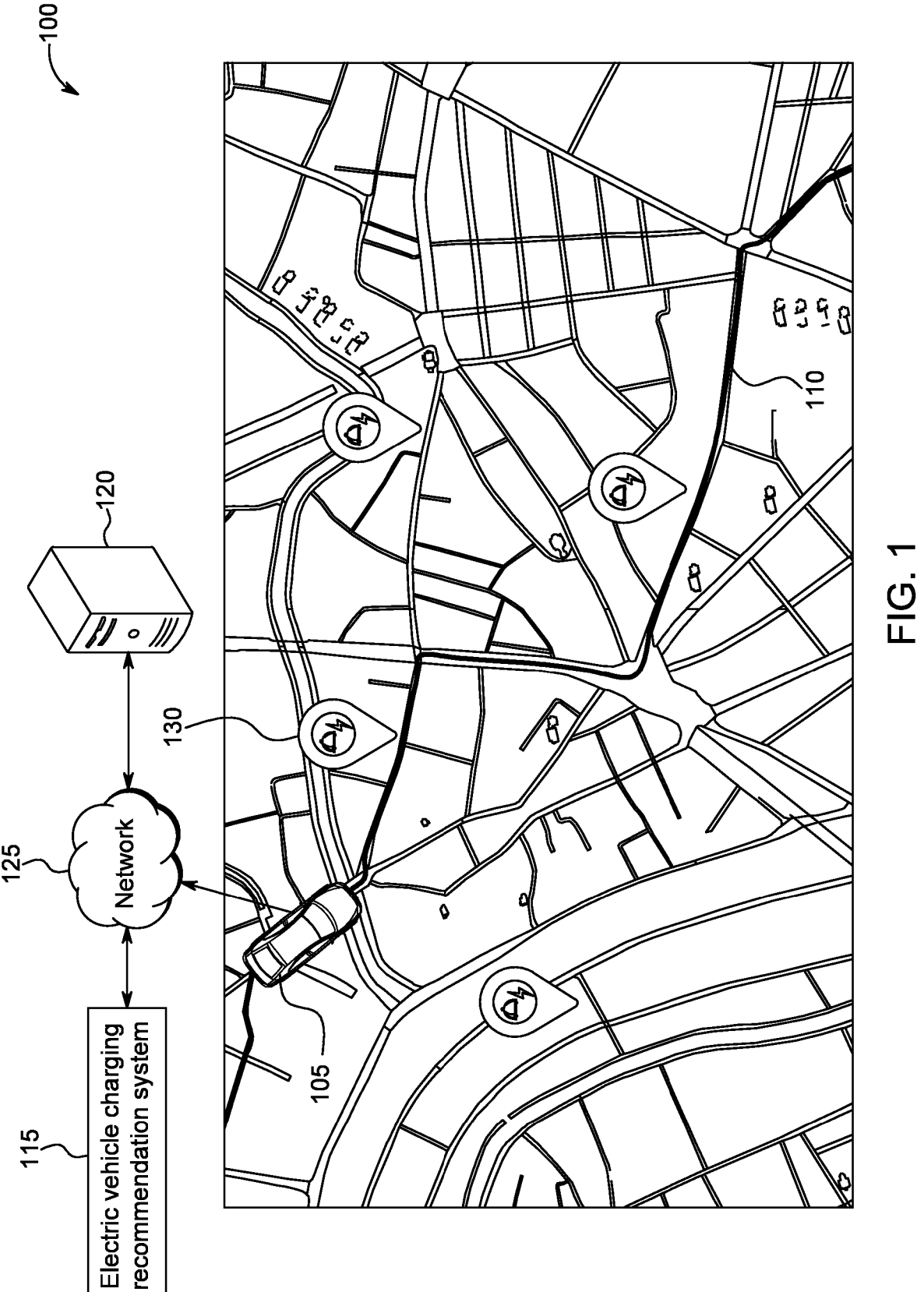
FIG. 1 depicts an example environment in which techniques and structures for providing the systems and methods disclosed herein may be implemented.

The present disclosure describes an electric vehicle charging recommendation system that may provide charging recommendations to a vehicle, which may enable the vehicle to complete a vehicle trip without any unplanned charging stoppages. The system may provide the charging recommendations when the system determines that the vehicle may not be able to complete the vehicle trip based on a current vehicle battery State of Charge (SOC) level. The system may provide the charging recommendations well in advance of a vehicle battery SOC becoming critically low, thus enabling a vehicle driver (a retail or a commercial vehicle driver) to minimize unplanned charging stoppages. The charging recommendations may include an optimum amount of energy to be charged in/transferred to the vehicle battery and/or an optimum time to charge the vehicle battery.

In some aspects, the system may obtain vehicle information, driver information, and vehicle trip information from the vehicle, a user device associated with the vehicle driver, and/or one or more servers. The vehicle information may include, for example, the current battery SOC, a current vehicle geolocation, information associated with battery charging rates for different SOC levels, a vehicle type, vehicle and cargo/loading weight, etc. The driver information may include, for example, an average driving speed, historical driving pattern, historical pattern of breaks on vehicle trips, and/or the like. The vehicle trip information may include, for example, a trip/shift time duration, a trip/shift distance, information associated with road condition, weather/season, traffic, etc. on a vehicle trip route, locations of fleet designated charging stations, locations of charging stations closest to the vehicle, and/or the like.

When the vehicle may be on the trip, the system may determine a distance remaining to be traversed by the vehicle based on the current vehicle geolocation, the average driving speed, and the remaining shift time duration. Responsive to determining the remaining distance, the system may determine an expected battery SOC that may be needed by the vehicle to traverse the remaining distance. The system may determine the expected battery SOC based on the obtained vehicle information, the driver information, and the vehicle trip information.

Responsive to determining the expected battery SOC, the system may compare the expected battery SOC with the current battery SOC. The system may provide charging recommendation to the vehicle when the expected battery SOC may be greater than the current battery SOC. The system may further recommend the amount of energy that may be charged in/transferred to the vehicle battery, which may be equivalent to a difference between the expected battery SOC and the current battery SOC.

The system may additionally recommend an optimum time to charge the vehicle battery based on the driver break schedule and/or the information associated with battery charging rates for different SOC levels. For example, the system may recommend charging the vehicle battery when the vehicle driver may be scheduled to take a break. As another example, the system may recommend to charge the vehicle battery when the battery SOC supports fast charging.

In further aspects, the system may recommend a location of a charging station at which the vehicle driver may charge the vehicle battery. The recommended charging station may be an available charging station that may be closest to the vehicle current geolocation and/or be a driver/fleet operator's preferred charging station. In additional aspects, the system may determine whether the current battery SOC may enable (or allow) the vehicle to travel to the closest charging station. The system may send a request to a mobile charging vehicle (e.g., a van or a drone) to provide charging assistance to the vehicle when the system determines that the current battery SOC may not enable the vehicle to travel to the closest charging station.

The present disclosure discloses an electric vehicle charging recommendation system that provides charging recommendations to the vehicle, which may enable the vehicle to complete a scheduled vehicle trip with any unplanned charging interruptions. The system recommends an optimum amount of energy that may be charged in the vehicle battery, thus saving charging time for the vehicle driver and conserving energy resources. The system further recommends an optimum time to charge the vehicle battery, which may enable fast battery charging and efficient usage of driver's break time.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 105 that may be a battery electric vehicle (BEV) or a plug-in hybrid electric vehicle (PHEV). The vehicle 105 may take the form of any passenger or commercial vehicle such as, for example, an off-road vehicle, a car, a crossover vehicle, a van, a minivan, a bus, a truck, etc. Further, the vehicle 105 may be a manually driven vehicle and/or may be configured to operate in partially or fully autonomous mode. The vehicle 105 may include a traction battery or battery pack ("vehicle battery", not shown) that may provide energy for vehicle propulsion. The vehicle battery may be charged by an external power source, for example an electric vehicle (EV) charger. The vehicle 105 may be travelling on a road network 110 that may be located in a city, a rural area, a suburb, etc.

The environment 100 may further include an electric vehicle charging recommendation system 115 (system 115) and one or more server(s) 120. The system 115, the server(s) 120, and the vehicle 105 may communicatively couple with each other via one or more networks 125. The network(s) 125 illustrates an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the server(s) 120 may be part of a cloud-based computing infrastructure and may be associated with and/or include a Telematics Service Delivery Network (SDN) that provides digital data services to the vehicle 105 and other vehicles (not shown in FIG. 1) that may be part of a commercial vehicle fleet. In this case, a vehicle fleet operator (not shown) may operate the server(s) 120. The vehicle fleet operator may store vehicle trip information associated each vehicle (e.g., the vehicle 105) of the vehicle fleet and/or vehicle trip information associated with each vehicle driver on the server(s) 120. The server(s) 120 may be configured to transmit the vehicle trip information to the system 115 and/or the vehicle 105 at a predefined frequency (e.g., every 1, 5 or 10 minutes), via the network 125. In additional aspects, the server(s) 120 may be associated with Global Positioning System (GPS), and may be configured to store and provide road and traffic information associated with the road network 110. The server(s) 120 may additionally store and provide charging station locations on the road network 110. In yet another aspect, the server(s) 120 may be configured to store and provide weather information in a geographical area including the road network 110.

The system 115 may be configured to provide charging recommendations to a vehicle driver associated with the vehicle 105 (and vehicle drivers associated with other vehicles operating as part of the vehicle fleet). The vehicle driver may be a retail or a commercial vehicle driver. Specifically, the system 115 may be configured to obtain one or more inputs from the vehicle 105 and the server(s) 120, and may provide charging recommendations to the vehicle driver based on the obtained inputs. The charging recommendations may be associated with an optimum amount of energy that may be charged in/transferred to the vehicle battery, and/or an optimum time to charge the vehicle battery. The system 115 may obtain the inputs from the vehicle 105 and the server(s) 120, and determine the charging recommendations at a predefined frequency (e.g., every 1, 5 or 10 minutes) such that the charging recommendations may be provided to the vehicle driver a predefined time duration in advance of battery state of charge (SOC) becoming critically low, as described below.

In some aspects, the system 115 may obtain a first input ("vehicle information") from the vehicle 105 via the network 125. The vehicle information may include, for example, a current vehicle battery SOC level, a vehicle current geolocation, an average vehicle travel speed, vehicle battery characteristics including information associated with battery charge rates for different battery SOC levels, vehicle weight (including weight of loads on the vehicle 105), vehicle type, vehicle historical travel or usage pattern, and/or the like.

The system 115 may further obtain a second input ("driver information") from a user device associated with the vehicle driver, the vehicle 105 and/or the server(s) 120 via the network 125. The driver information may include, for example, driver break schedule on a vehicle trip, historical driving pattern including average driving speeds of the vehicle driver for different vehicle types, driver preferences for specific EV charging stations, and/or the like. In some aspects, the driver break schedule may be based on historical pattern of breaks typically taken by the vehicle driver. For example, the driver break schedule may indicate specific times of day when the vehicle driver typically takes breaks, specific distance the vehicle driver may drive a vehicle before taking a break, and/or the like. In other aspects, the driver break schedule may be defined or preset by the fleet operator. In this case, the server(s) 120 may provide the driver break schedule to the system 115.

The system 115 may additionally obtain a third input ("vehicle trip information" associated with the vehicle 105 and/or the vehicle driver) from the server(s) 120 via the network 125. The vehicle trip information may include, for example, a total vehicle trip time duration (or preset "shift time duration" for the vehicle driver), a total vehicle trip distance (or preset "shift distance" for the vehicle driver), locations of charging stations on the vehicle trip, locations of fleet designated charging stations, locations of charging stations closest to the vehicle 105, fleet depot location(s), source and destination locations associated with the vehicle trip, information associated with traffic, weather/season and road condition on a vehicle trip route, information associated with scheduled vehicle stoppage time durations in the vehicle trip, and/or the like. The shift time duration may indicate a minimum time duration the vehicle driver may be expected to drive on the vehicle trip in a day (e.g., for 8 hours, from 8 AM till 4 PM, etc.). The shift distance may indicate a minimum distance the vehicle driver may be expected to travel on the vehicle trip in a day (e.g., 150 miles, 200 miles, etc.). Weather information may include, for example, expected ambient temperature on the vehicle trip route, wind conditions, presence or absence of snow or rain, and/or the like. Road condition information may include road grade, road curvature, road inclination (e.g., uphill or downhill road), and/or the like.

Responsive to obtaining the vehicle information, the driver information and the vehicle trip information, the system 115 may be configured to estimate whether the vehicle 105 would be able to complete the vehicle trip with the current battery SOC level. To determine whether the vehicle 105 would be able to complete the vehicle trip, the system 115 may first determine a remaining distance to be traversed by the vehicle 105 on the vehicle trip based on the vehicle current geolocation, an average driving speed of the vehicle driver (or vehicle 105 travel speed) on the vehicle trip, and the remaining shift time duration. For example, if the average driving speed is 30 miles per hour and the remaining shift time duration is 3 hours, the system 115 may determine that the distance remaining to be traversed by the vehicle 105 may be 90 miles. In some aspects, the distance remaining to be traversed may additionally be based on road condition, weather condition, and/or the like (e.g., average driving speed may be lower in inclement weather conditions). In other aspects, the system 115 may determine the remaining distance to be traversed by the vehicle 105 based on the vehicle current geolocation and the shift distance. In this case, the system 115 may obtain a vehicle trip start location from the server(s) 120 and may determine a vehicle trip destination location by adding the shift distance (e.g., adding geo-distance) to the vehicle trip start location. The system 115 may determine the distance remaining to be traversed by the vehicle 105 by subtracting the vehicle current geolocation (e.g., subtracting geo-distance) from the vehicle trip destination location.

Responsive to determining the distance remaining to be traversed by the vehicle 105, the system 115 may determine whether the current battery SOC level may enable (or allow) the vehicle operator to traverse the remaining distance. Stated another way, the system 115 may "predict" whether the vehicle battery may run out of charge before the vehicle 105 travels the remaining distance, or the vehicle battery has enough charge to travel the remaining distance. The system 115 may determine whether the current battery SOC level may enable (or allow) the vehicle operator to traverse the remaining distance by determining energy efficiency patterns of the vehicle 105 and the vehicle driver. The concept of energy efficiency patterns is described in conjunction with FIG. 2.

Responsive to determining that the vehicle 105 may not be able to travel the remaining distance, the system 115 may determine an optimum amount of energy that the vehicle driver may charge in/transmit to the vehicle battery and/or an optimum time for battery charging, which may enable the vehicle driver to complete the remaining distance. The system 115 may then transmit a charging recommendation notification to a user device associated with the vehicle driver and/or a vehicle Human-Machine Interface (HMI). The recommendation notification may include the determined optimum amount of energy and the optimum time for battery charging.

In some aspects, the system 115 may determine the optimum amount of energy such that the amount of energy may be sufficient to enable the vehicle 105 to travel the remaining distance (and may travel back to fleet depot). The system 115 may not recommend addition of excess energy, which may result in increase of charging time. In this manner, the system 115 may enable optimizing battery charging time duration for the vehicle 105. Details of process to determine the optimum amount of energy is described in conjunction with FIG. 2.

The system 115 may determine the optimum time for battery charging based on the driver break schedule and/or the information associated with battery charge rates for different battery SOC levels. For example, the system 115 may use the information associated with battery charge rates for different battery SOC levels, and may recommend the vehicle driver to charge the vehicle battery when the battery SOC level supports fast charging. This may facilitate the vehicle driver to save time in charging the vehicle battery.

As another example, the system 115 may recommend the vehicle driver to charge the vehicle battery when the driver takes a break (based on the driver break schedule). In this case, the system 115 may additionally recommend a charging station (e.g., a charging station 130) where the vehicle driver may charge the vehicle battery. The charging station 130 may be on the vehicle trip route, and may be a driver-preferred charging station and/or a fleet operator-preferred charging station. The charging station 130 may additionally include food, recreational, etc. facilities that may enable the vehicle driver to take the break, and charge the vehicle battery simultaneously. In this case, the system 115 may transmit charging station 130 location to the user device and/or the vehicle HMI.

In some aspects, to recommend the charging station 130 to the vehicle driver to charge the vehicle battery, the system 115 may first determine one or more charging stations that may be located on the vehicle trip route at which the vehicle driver may charge the vehicle battery (e.g., one or more charging stations where the driver may take a break). The system 115 may further determine a charging station (e.g., the charging station 130) from the determined one or more charging stations that may be closest to the vehicle current geolocation. The system 115 may then determine whether the current battery SOC level would enable (or allow) the vehicle 105 to reach to the determined closest charging station (e.g., the charging station 130). The system 115 may transmit the charging station 130 location to the user device and/or the vehicle HMI when the system 115 determines that the current battery SOC level would enable (or allow) the vehicle 105 to reach to the charging station 130.

On the other hand, the system 115 may transmit an assistance notification/request to the server(s) 120 when the system 115 determines that the current battery SOC level may not enable (or allow) the vehicle 105 to reach to the charging station 130. In this case, responsive to receiving the assistance notification, the server(s) 120 (or the fleet operator) may send command to a remote charging vehicle (e.g., van) or a charging drone to reach to the vehicle 105 and charge the vehicle battery. The server(s) 120 may additionally send real-time vehicle 105 geolocation to the remote charging vehicle/charging drone, so that the charging vehicle/charging drone may track vehicle 105 movement and provide charging assistance to the vehicle 105 based on the real-time vehicle 105 geolocation.

A person ordinarily skilled in the art may appreciate from the description above that since the system 115 determines the charging recommendations at a predefined frequency (e.g., every 1, 5 or 10 minutes), the system 115 may proactively determine well in advance that the vehicle 105 may not be able to complete the vehicle trip with the current SOC level. Accordingly, the system 115 may provide charging recommendation to the vehicle driver before the battery SOC becomes critically low. In this manner, the system 115 may assist the vehicle driver in better planning battery charging on the vehicle trip. Further, since the system 115 recommends an optimum time (e.g., during driver's scheduled break) to charge the vehicle battery, unplanned stoppages for battery charging may be minimized. Furthermore, since the system 115 recommends an optimum amount of energy to charge the vehicle battery along with the optimum time (which may be, for example, at an SOC level at which the vehicle battery may enable fast charging), the system 115 may assist in reducing charging time.

Detailed process of determining and providing charging recommendations to the vehicle 105 is described below in conjunction with FIG. 2.

Figure 2:
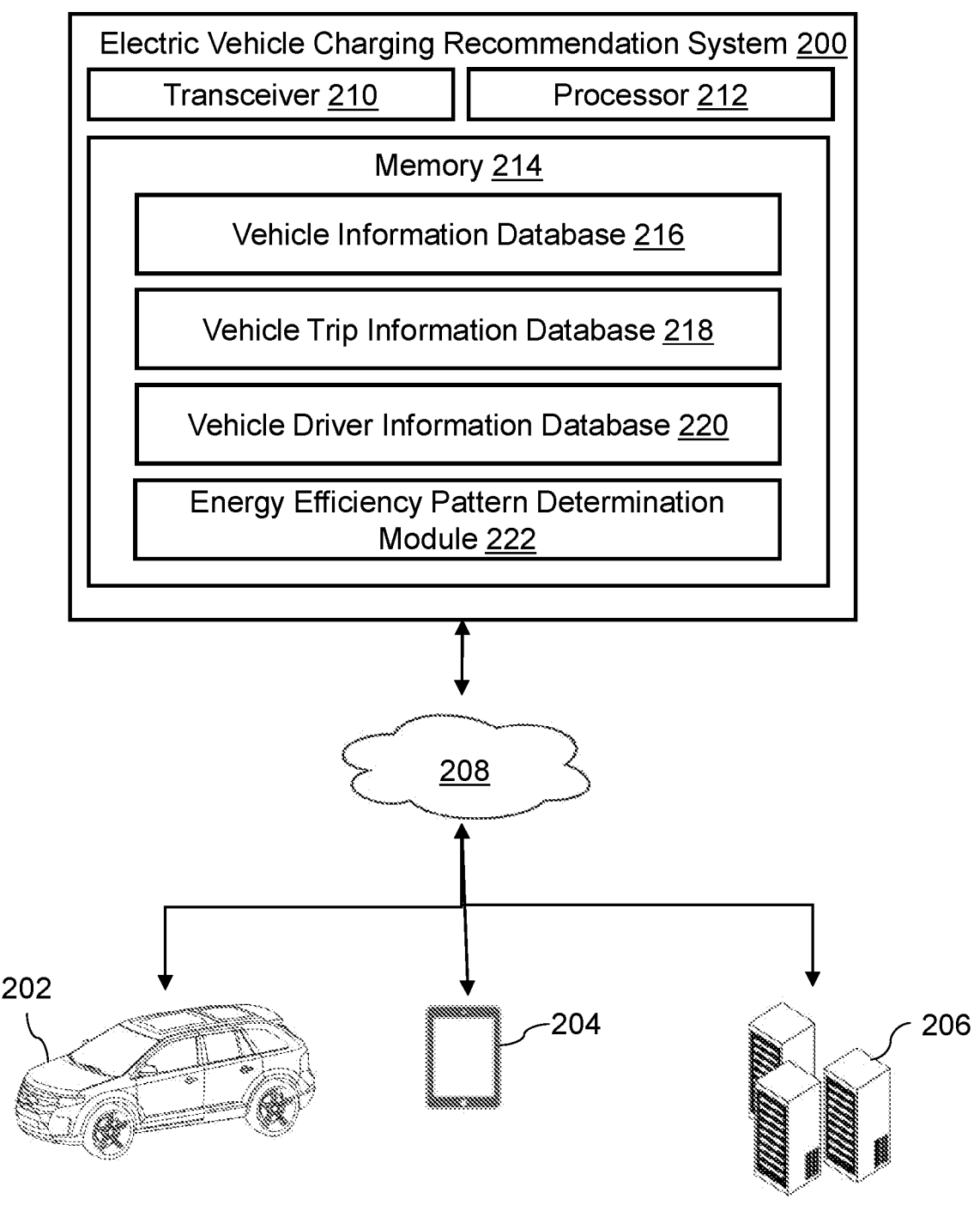
FIG. 2 depicts a block diagram of an example electric vehicle (EV) charging recommendation system in accordance with the present disclosure.

FIG. 2 depicts a block diagram of an example electric vehicle (EV) charging recommendation system 200 (system 200) in accordance with the present disclosure. While describing FIG. 2, references may be made to FIGS. 3, 4 and 5.

The system 200 may be same as the system 115. The system 200, as described herein, can be implemented in hardware, software (e.g., firmware), or a combination thereof. The system 200 may be connected with a vehicle 202, a user device 204 and one or more server(s) 206 via a network 208. In some aspects, the system 200 may be a part of the vehicle 202. In other aspects, the system 200 may be a part of the server(s) 206. In yet another aspect, the system 200 may be part of an external server (not shown) that may not be part of the server(s) 206.

The vehicle 202 may be same as the vehicle 105, the server(s) 206 may be same as the server(s) 120, and the network 208 may be same as the network 125. The user device 204 may be associated with a vehicle driver (not shown) of the vehicle 202. The user device 204 may be, for example, a mobile phone, a laptop, a computer, a tablet, a wearable device, or any other similar device with communication capabilities.

The system 200 may include a plurality of units including, but not limited to, a transceiver 210, a processor 212, and a memory 214. The transceiver 210 may be configured to transmit and receive information to and from the vehicle 202, the user device 204, and the server(s) 206, via the network 208.

The processor 212 may be an Artificial Intelligence (AI) based processor and may be disposed in communication with one or more memory devices, e.g., the memory 214 and/or one or more external databases (not shown in FIG. 2). The processor 212 may utilize the memory 214 to store programs in code and/or to store data for performing various system 200 operations in accordance with the present disclosure. The memory 214 may be a non-transitory computer-readable memory storing an EV charging recommendation program code. The memory 214 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The memory 214 may include a plurality of modules and databases including, but not limited to, a vehicle information database 216, a vehicle trip information database 218, a vehicle driver information database 220, and an energy efficiency pattern determination module 222. The energy efficiency pattern determination module 222, as described herein, may be stored in the form of computer-executable instructions, and the processor 212 may be configured and/or programmed to execute the stored computer-executable instructions for performing system 200 functions in accordance with the present disclosure.

The vehicle information database 216 may store information associated with a plurality of vehicles operating as part of a vehicle fleet, and/or a plurality of passenger vehicles. For example, the vehicle information database 216 may store the vehicle information associated with the vehicle 202, as described above in conjunction with FIG. 1. In particular, the transceiver 210 may receive/obtain the vehicle information from the vehicle 202 at a predefined frequency (e.g., every minute or every 5-10 minutes). Examples of the vehicle information are already described in conjunction with FIG. 1. Responsive to receiving the vehicle information, the transceiver 210 may send the vehicle information to the vehicle information database 216 for storage purpose.

The vehicle trip information database 218 may store the vehicle trip information associated with the plurality of vehicles operating as part of the vehicle fleet and/or the plurality of passenger vehicles, and/or vehicle trip information of associated vehicle drivers. For example, the vehicle trip information database 218 may store the vehicle trip information associated with the vehicle 202, as described above. The transceiver 210 may receive/obtain the vehicle trip information from the server(s) 206 and/or the vehicle 202 (e.g., if the vehicle 202 is a passenger vehicle) at the predefined frequency. The transceiver 210 may send the received vehicle trip information to the vehicle trip information database 218 for storage purpose.

The vehicle driver information database 220 may store the driver information associated with drivers that may drive the plurality of vehicles operating as part of the vehicle fleet, and/or the plurality of passenger vehicles. For example, the vehicle driver information database 220 may store the driver information associated with the vehicle driver of the vehicle 202, as described above. The transceiver 210 may receive/obtain the driver information from the user device 204, the vehicle 202, and/or the server(s) 206 at the predefined frequency. The transceiver 210 may send the received driver information to the vehicle driver information database 220 for storage purpose.

In operation, the processor 212 may obtain the vehicle information associated with the vehicle 202 from the vehicle information database 216, corresponding vehicle trip information from the vehicle trip information database 218, and the vehicle driver information from the vehicle driver information database 220. In some aspects, the processor 212 may obtain the information in response to obtaining a trigger signal from the user device 204, the vehicle 202 and/or the server(s) 206 (via the transceiver 210). The trigger signal may indicate that the vehicle 202 may have commenced the vehicle trip or may commence the vehicle trip in a predefined time duration (e.g., in 5 or 10 minutes). Responsive to obtaining the trigger signal, the processor 212 may obtain the information from respective databases. Further, while the vehicle 202 may be traversing the vehicle trip, the processor 212 may regularly obtain the information from the respective databases at the predefined frequency, till the vehicle 202 completes the vehicle trip (as determined from the vehicle 202 geolocation obtained from the vehicle 202 and/or the user device 204).

Responsive to obtaining the information described above, the processor 212 may determine a distance remaining to be traversed by the vehicle 202 on the vehicle trip based on the vehicle information, the vehicle trip information and/or the driver information. For example, the processor 212 may determine the remaining distance by multiplying average driving/travel speed (of the vehicle driver and/or the vehicle 202) on the vehicle trip with remaining shift time duration of the vehicle driver. As another example, the processor 212 may determine the remaining distance by subtracting vehicle 202 current geolocation from the trip destination location (e.g., a trip destination input by the vehicle driver or the fleet operator on the user device 204 or the server(s) 206). In additional aspects, the processor 212 may determine the remaining distance based on scheduled stoppages along the vehicle trip (which may reduce effective drive time from the remaining shift time duration), scheduled shift distance to be travelled by the vehicle driver on the vehicle trip, and/or the like.

In further aspects, responsive to obtaining the information described above, the processor 212 may determine an energy efficiency pattern associated with the vehicle 202 and/or the vehicle driver by using the instructions stored in the energy efficiency pattern determination module 222. Specifically, the processor 212 may use Artificial Intelligence/Machine Learning (AI/ML) algorithms (that may be part of the energy efficiency pattern determination module 222) to determine a unit distance per SOC level that the vehicle 202 may traverse based on the vehicle information, the driver information and the vehicle trip information. In some aspects, the energy efficiency pattern may be same as the determined unit distance per SOC level.

Figure 3:
FIG. 3 depicts an exemplary graph of unit distance with vehicle battery State of Charge (SOC) in accordance with the present disclosure.
Figure 3:
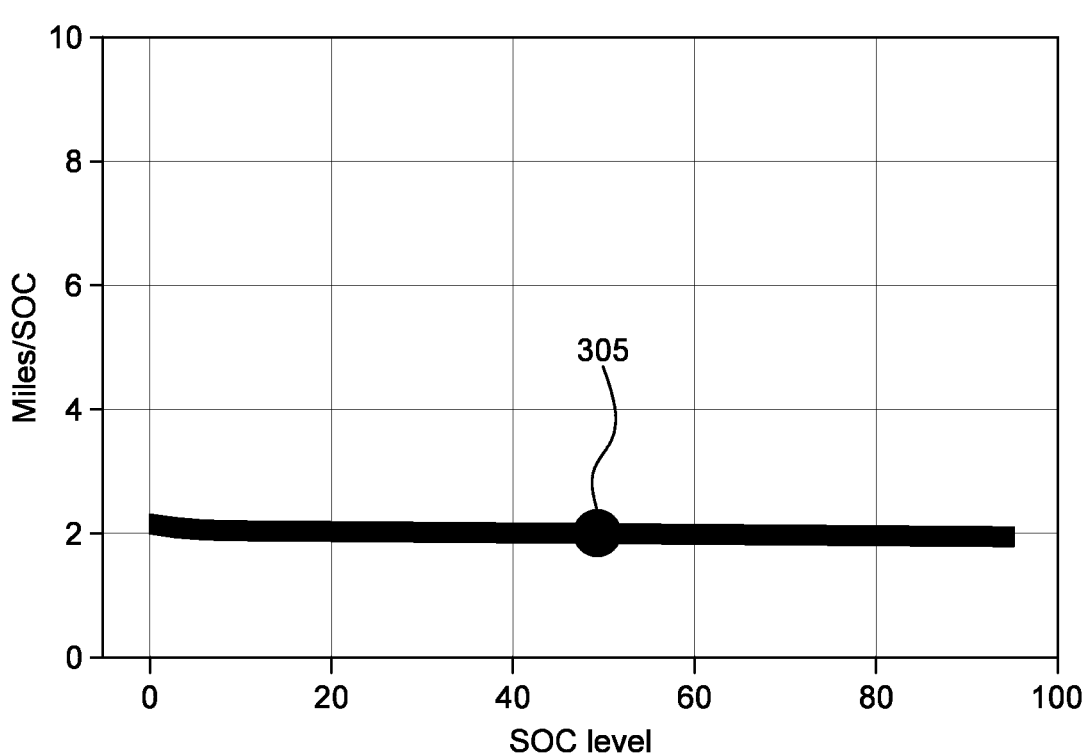

An exemplary graph 300 illustrating unit distances with different battery SOC levels is depicted in FIG. 3. Graph 300 X-axis illustrates different vehicle battery SOC levels, and graph 300 Y-axis illustrates miles/SOC level. The processor 212 may determine unit distances per SOC at different SOC levels for the vehicle 202, as shown in the graph 300, based on the vehicle 202 information, the driver information and the vehicle trip information. For example, the processor 212 may determine that when the vehicle battery SOC is 50 (shown as point 305 on the graph 300), the vehicle 202 may be able to travel 2 miles per SOC. In a similar manner, the processor 212 may determine unit distances at each SOC level (e.g., from SOC level of 0 to 100). In some aspects, the processor 212 may average unit distances per SOC at different SOC levels to calculate a "final" unit distance per SOC for the vehicle 202.

In some aspects, the processor 212 may determine the energy efficiency pattern (as shown in the graph 300) for the vehicle 202 based on vehicle driver historical driving pattern (e.g., of past 1, 3, or 6 months), historical average driving speed, historical traffic condition on the vehicle trip, road condition on the vehicle trip, ambient conditions (e.g., temperature, wind, etc.), vehicle weight (including load and/or passenger weight), and/or the like. For example, if the vehicle weight is high (e.g., if the vehicle 202 may be carrying heavy load) or if the road condition indicates an uphill road, the determined unit distance per SOC may be low. On the other hand, if the vehicle weight is low or if the road condition indicates a downhill road, the determined unit distance per SOC may be higher. The processor 212 may send the determined energy efficiency pattern to the memory 214 for storage purpose.

Responsive to determining the energy efficiency pattern, the processor 212 may determine an expected SOC that may be required by the vehicle 202 to travel the remaining distance on the vehicle trip. In some aspects, the processor 212 may determine the expected SOC by dividing the remaining distance and the "final" unit distance per SOC for the vehicle 202. For example, if the remaining distance is 120 miles and the unit distance per SOC is 2 miles/SOC, the processor may determine the expected SOC as 60 (i.e., 120/2). In some aspects, the processor 212 may add a predefined "buffer" SOC (e.g., 5 or 10) to the determined SOC to calculate a "final" expected SOC. The buffer SOC value (e.g., 5 or 10) may preset by the fleet operator (if the vehicle 202 is part of a commercial vehicle fleet) or the vehicle driver (if the vehicle 202 is a passenger vehicle), and may be pre-stored in the memory 214. In this case, the processor 212 may first fetch the pre-stored buffer SOC value from the memory and add the buffer SOC value to the determined expected SOC to calculate the final expected SOC.

Responsive to determining the final expected SOC, the processor 212 may determine a difference between the final expected SOC and the current vehicle battery SOC (that may be obtained as part of the vehicle information). If the difference between the final expected SOC and the current battery SOC is negative (i.e., the final expected SOC is less than the current battery SOC), the processor 212 may determine that the vehicle 202 may have enough battery SOC to travel the remaining distance. On the other hand, if the difference between the final expected SOC and the current battery SOC is positive (i.e., the final expected SOC is greater than the current battery SOC), the processor 212 may determine that the vehicle 202 may have not enough battery SOC to travel the remaining distance.

Responsive to determining that the vehicle 202 may have enough battery SOC to travel the remaining distance, the processor 212 may perform the process of determining the expected SOC iteratively at the predefined frequency, till the vehicle trip is completed or till the determined expected SOC exceeds the current battery SOC level at any point during the vehicle trip.

On the other hand, responsive to determining that the vehicle 202 may have not enough battery SOC to travel the remaining distance, the processor 212 may transmit (via the transceiver 210) a charging recommendation notification to the user device 204 or a vehicle 202 HMI (not shown). The recommendation notification may include an optimum amount of energy to be charged in/transferred to the vehicle battery, and/or an optimum time to charge the vehicle battery. In some aspects, the optimum amount of energy to be charged in/transferred to the vehicle battery is the difference between the final expected SOC and the current battery SOC. For example, if the final expected SOC is 60 and the current battery SOC is 40, the optimum amount of energy may be 20. In this manner, the processor 212 may recommend the vehicle driver to charge an amount of energy that may be required to travel the remaining distance (plus the SOC buffer value), and may not recommend to charge the vehicle battery 100% (which may not be required). The processor 212 may thus save charging time and charging resources/energy.

As described in conjunction with FIG. 1, the optimum time to charge the vehicle battery may be based on driver's break schedule. In this case, the processor 212 may determine the driver's break schedule from the driver information (e.g., if the vehicle 202 is a passenger vehicle) and/or the vehicle trip information (e.g., if the vehicle 202 is a commercial vehicle, and the driver break schedule is pre-planned by the fleet operator operating the server(s) 206), and recommend the vehicle driver to charge the vehicle battery during the break. An example scenario of the vehicle driver charging the vehicle battery during the break time is shown in FIG. 4.

Figure 4:
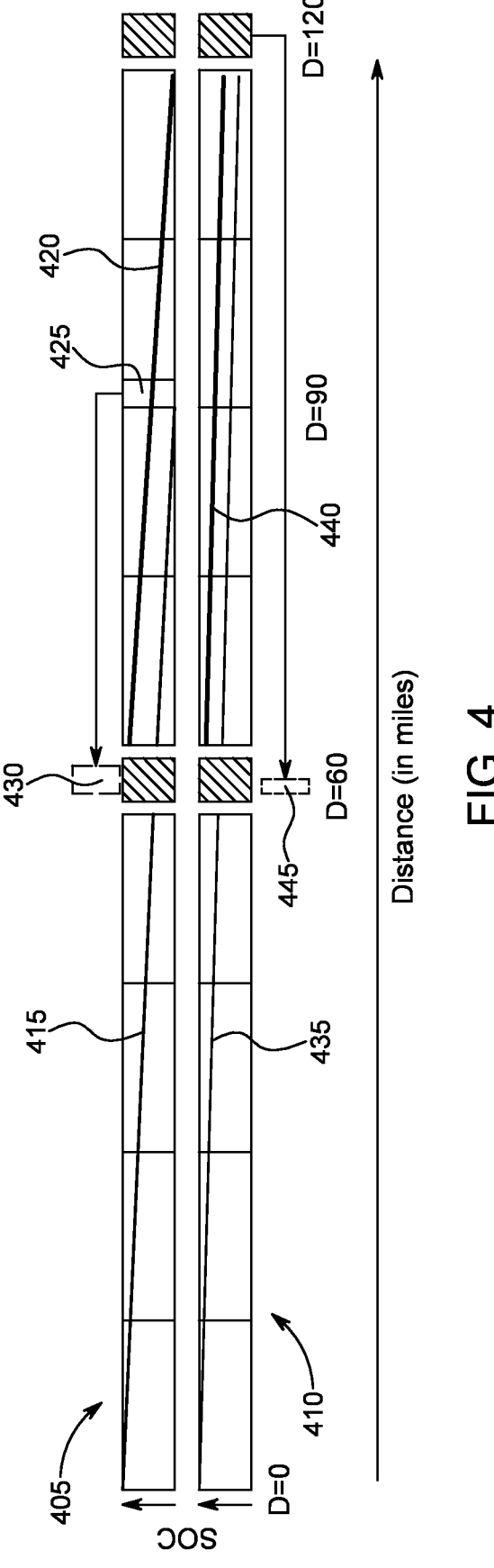
FIG. 4 depicts exemplary graphs illustrating battery SOC for two EVs in accordance with the present disclosure.

Specifically, FIG. 4 depicts graphs illustrating battery SOCs for two EVs in accordance with the present disclosure. Graph 405 in FIG. 4 depicts SOC levels for a first vehicle (e.g., the vehicle 202), and graph 410 depicts SOC levels for a second vehicle (that may be similar to the first vehicle). X-axis of the graphs 405, 410 depict distance (e.g., in miles), and Y-axis depicts SOC levels for batteries associated with the first vehicle and the second vehicle.

In an exemplary scenario, at distance "D=0", the first vehicle may not have enough battery SOC to complete the remaining distance (which may be, for example, D=120 miles). For example, battery SOC 415 for the first vehicle may drop to zero at D=90 miles. In this case, the processor 212 may determine at D=0 that the expected SOC for the first vehicle to complete the remaining distance of 120 miles may be greater than the current battery SOC at D=0. Responsive to the determination, the processor 212 may transmit the recommendation notification to the vehicle driver (via the user device 204 and/or the vehicle HMI) to charge the vehicle battery when the driver takes a break. In an exemplary aspect, responsive to receiving the recommendation notification, the driver may charge the vehicle battery when the driver takes the break (which may be at D=60). The battery SOC for the first vehicle may increase to an SOC level 420 shown in the graph 405, when the driver charges the vehicle battery during the break. As shown in the graph 405, the SOC level 420 may enable the first vehicle to travel the remaining distance.

A person ordinarily skilled in the art may appreciate that by recommending the driver to charge the vehicle battery during breaks when the first vehicle may not be expected to complete the remaining distance at the current SOC level, the processor 212 may assist the vehicle driver to minimize unplanned charging stoppages. For example, the vehicle driver may have been required to take an unplanned charging stoppage at a point 425 (i.e., at D=90), if the processor 212 would not have identified beforehand that the first vehicle may not be able to complete the vehicle trip and recommended to charge the vehicle battery during the break. By providing the charging recommendation, the processor 212 may assist the driver to "shift" the unplanned charging stoppage at the point 425 to a planned or scheduled stoppage (shown as a point 430) at which the driver was expected to take a break. In this manner, the processor 212 may assist the driver to complete the vehicle trip without any unplanned charging related disruptions.

FIG. 4 additionally depicts the graph 410 associated with the second vehicle, which may enough battery SOC (shown as SOC 435) to complete the vehicle trip. In this case, the processor 212 may not provide the charging recommendation. The driver may still charge the battery during the break to increase the battery SOC to a level 440, which may enable the second vehicle to travel beyond the scheduled vehicle trip end. For example, the second vehicle may return to a depot or the point at which the driver may have taken the break (shown as a point 445) after finishing the vehicle trip, to park the second vehicle.

In some aspects, the energy efficiency pattern may vary based on weather conditions or seasons. For example, the energy efficiency pattern for the vehicle 202 may be different in different seasons or ambient conditions such summers, winters, springtime, etc. The processor 212 may determine the season, and then determine expected SOC associated with the determined season that may be needed by the vehicle 202 to complete the vehicle trip, as described above. For example, the vehicle 202 may not need frequent charging during springtime; however, the vehicle 202 may need mid-trip charging during winters or summers.

Figure 5:
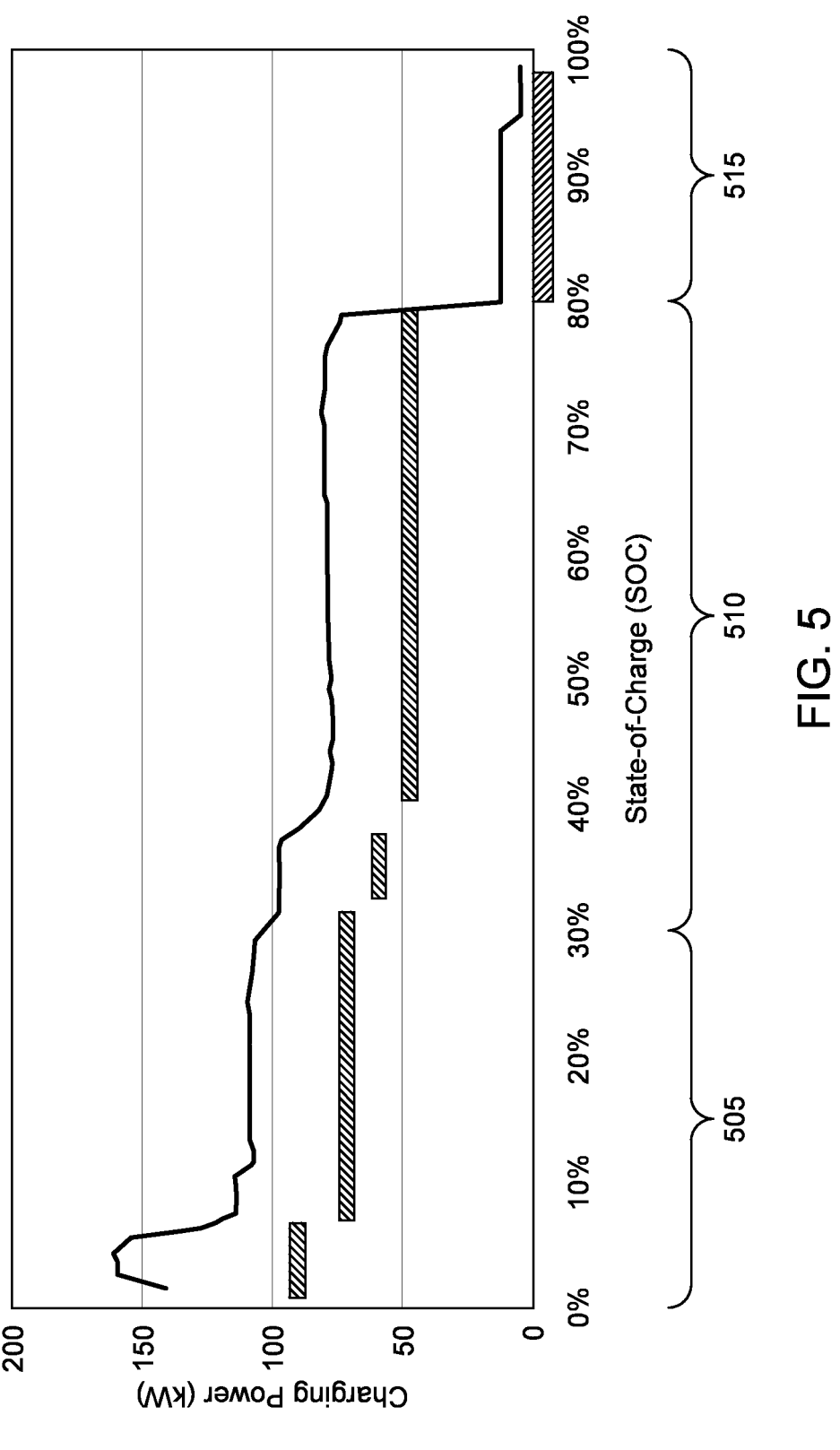
FIG. 5 depicts an exemplary graph of battery charging power with battery SOC in accordance with the present disclosure.

In additional aspects, the optimum time to charge the vehicle battery may be based on the information associated with vehicle battery charge rates for different battery SOC levels (that may part of the vehicle information). Exemplary information associated with vehicle battery charge rates for different battery SOC levels is depicted in FIG. 5. Specifically, FIG. 5 depicts a graph 500 that illustrates different battery charging power rates in Y-axis, and different battery SOC levels in X-axis. As shown in the graph 500, the battery charging rate may be highest in a first SOC range 505, may be high in a second SOC range 510, and may be low in a third SOC range 515. In this case, the processor 212 may recommend the vehicle driver to charge the vehicle battery when the current battery SOC level may be in the first range 505 or the second range 510. This may enable fast charging of the vehicle battery, and may thus save charging time for the vehicle driver.

In some aspects, along with providing recommendations for the optimum amount of energy to be charged in the vehicle battery and/or the optimum time to charge the vehicle battery, the processor 212 may provide recommendations for locations of charging stations to the user device 204 (and/or the vehicle HMI) at which the driver may charge the vehicle battery. To provide charging station location recommendation, the processor 212 may first identify locations of a plurality of driver or fleet operator-preferred charging stations that may have available chargers (in working condition) on the vehicle trip route. The processor 212 may then identify distances of each charging station from the current vehicle 202 geolocation. In some aspects, the processor 212 may recommend location of a closest charging station (specifically, a charging station with least distance from the current vehicle 202 geolocation) to the driver to charge the vehicle battery. In other aspects, the processor 212 may recommend location of a charging station that may be closest to a place where the driver typically takes breaks.

In yet another aspect, the processor 212 may determine a "zone" on the vehicle trip route where the vehicle battery SOC may be expected to be in the first range 505 or the second range 510 (e.g., when the current vehicle battery SOC may be in the third range 515) to recommend a charging station location. In this case, the processor 212 may use the determined energy efficiency pattern to estimate a distance that the vehicle 202 may need to travel on the vehicle trip before the vehicle battery SOC enters the first range 505 or the second range 510 (or the vehicle 202 enters the "zone" on the vehicle trip route where the vehicle battery may support fast charging). In this aspect, the processor 212 may recommend a location of a charging station that may be located in the determined zone where the vehicle battery may support fast charging.

In further aspects, the processor 212 may determine whether the current battery SOC may enable (or allow) the vehicle 202 to reach to the closest charging station (or the charging station location recommended by the processor 212). For example, in this case, the processor 212 may use the determined energy efficiency pattern to estimate a maximum distance that the vehicle 202 may travel based on the current battery SOC. The processor 212 may then compare the estimated maximum distance with a distance between the vehicle current location and a closest charging station location. The processor 212 may recommend the driver to charge the vehicle battery at the closest charging station (and transmit the closest charging station location to the user device 204, via the transceiver 210) when the estimated maximum distance may be greater than the distance between the vehicle current location and the closest charging station location.

On the other hand, the processor 212 may transmit an assistance notification/request to the server(s) 206 when the processor 212 determines that the maximum distance may be less than the distance between the vehicle current location and the closest charging station location. This may indicate that the vehicle 202 may not be able to reach to the closest charging station, and may hence need assistance (e.g., from mobile charging vans, drones, etc.). The assistance notification/request is already described in conjunction with FIG. 1.

The processor 212 may additionally transmit the assistance notification/request to the server(s) 206 when the vehicle trip route may have no or less count of available charging stations, when the vehicle trip route includes areas or zones where stranded EVs may have been reported historically, or when the vehicle trip route includes areas or zones where network connectivity may be low.

In some aspects, the assistance notifications/requests provided by the processor 212 may assist the fleet operator to better plan vehicle fleet battery charging and charger specifications. For example, the fleet operator may analyze historical assistance notifications/requests over a predefined time duration (e.g., 3 months, 6 months, etc.), and may proactively plan to provide additional assistance to certain vehicle types, vehicle drivers, or on certain vehicle trip routes based on the analysis. As an example, the fleet operator may provide or allocate portable power banks to certain vehicles or vehicle drivers who may frequently require mobile charging assistance. Similarly, the fleet operator may provide batteries with larger storage capacities to vehicles or vehicle drivers who may frequently require mobile charging assistance.

Figure 6:
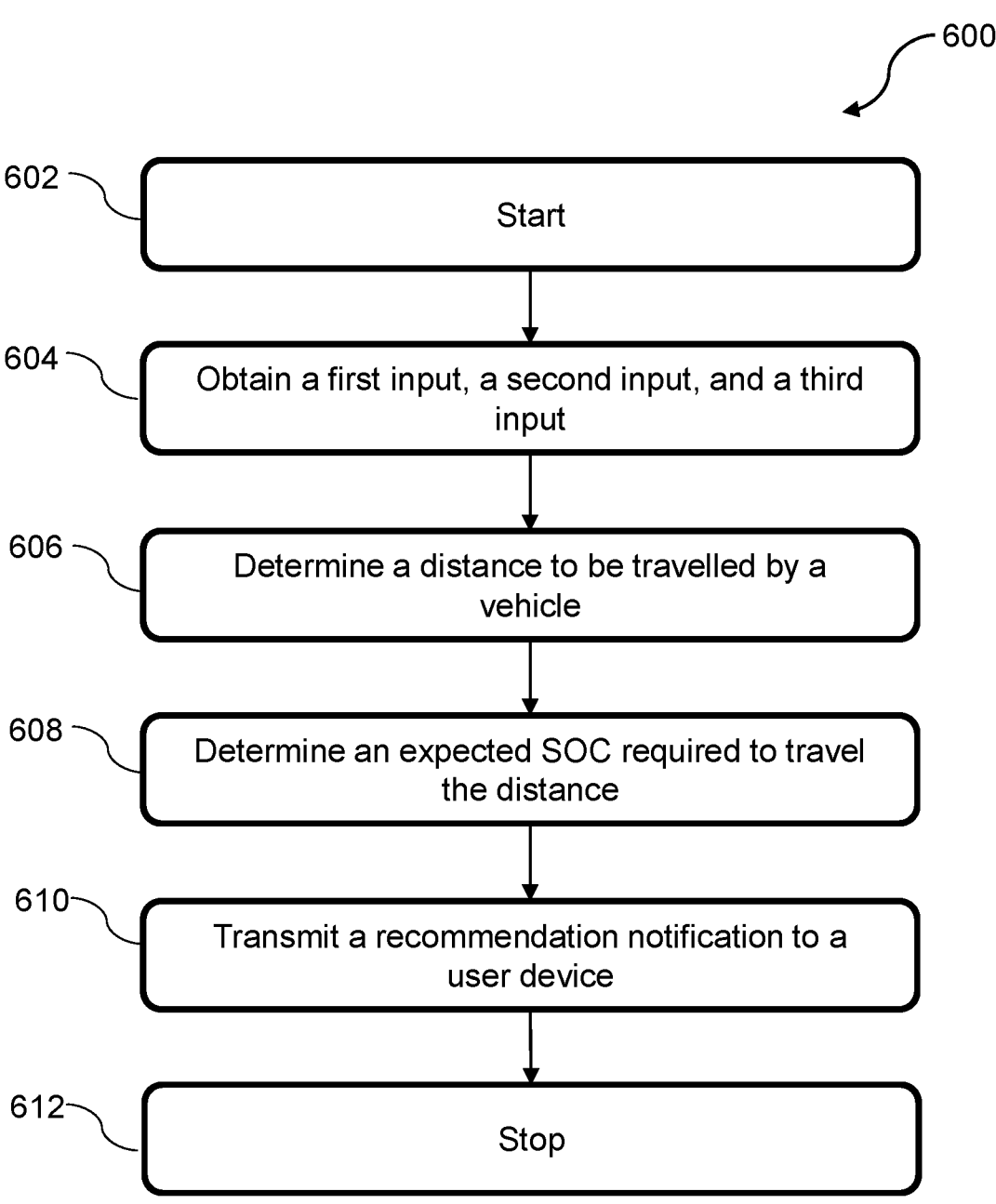
FIG. 6 depicts a flow diagram of an example EV charging recommendation method in accordance with the present disclosure.

FIG. 6 depicts a flow diagram of an example EV charging recommendation method 600 in accordance with the present disclosure. FIG. 6 may be described with continued reference to prior figures, including FIGS. 1-5. The following process is exemplary and not confined to the steps described hereafter. Moreover, alternative embodiments may include more or less steps that are shown or described herein and may include these steps in a different order than the order described in the following example embodiments.

The method 600 starts at step 602. At step 604, the method 600 may include obtaining, by the processor 212, a first input associated with a vehicle, a second input associated with a vehicle driver, and a third input associated with a vehicle trip. As described above in conjunction with FIGS. 1 and 2, the first input may be the vehicle information, the second information may be the driver information, and the third input may be the vehicle trip information. In some aspects, the first vehicle information may include a current vehicle battery SOC and a vehicle current geolocation.

At step 606, the method 600 may include determining, by the processor 212, the distance remaining to be travelled by the vehicle 202 in the vehicle trip. Specifically, the processor

212 may determine the distance to be travelled by the vehicle 202 from the vehicle current geolocation based on the vehicle trip information.

At step 608, the method 600 may include determining, by the processor 212, an expected SOC required to travel the remaining distance from the vehicle current geolocation based on the vehicle information, the driver information and the vehicle trip information, as described above in conjunction with FIG. 2. At step 610, the method 600 may include transmitting, by the processor 212 (via the transceiver 210), a recommendation notification to the user device 204 (or the vehicle HMI) to charge the vehicle battery when the expected SOC may be greater than the current SOC. As described above, the recommendation notification may include an optimum time to charge the vehicle battery and/or optimum an amount of energy to be charged in the vehicle battery.

The method 600 may end at step 612.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for providing electric vehicle charging recommendation, the method comprising:
   obtaining, by a processor, a first input associated with a vehicle, a second input associated with a vehicle driver, and a third input associated with a vehicle trip, wherein the first input comprises a current state of charge (SOC) of a vehicle battery, information associated with vehicle battery charge rates for different battery SOC levels, vehicle and cargo weight, a vehicle type, and the vehicle current location;
   determining, by the processor, a first distance to be travelled by the vehicle from a vehicle current location, based on the third input, an average driving speed of the vehicle driver, and a remaining time of a working shift of the vehicle driver;
   determining, by the processor, an expected SOC required to travel the first distance from the vehicle current location based on the first input, the second input and the third input; and
   transmitting, by the processor, a recommendation notification to a user device to charge the vehicle battery when the expected SOC is greater than the current SOC, wherein the recommendation notification comprises a time to charge the vehicle battery or an amount of energy to be transferred to the vehicle battery.

2. The method of claim 1 further comprising determining the first distance based on the second input.

3. The method of claim 1 further comprising:
   determining a difference between the expected SOC and the current SOC;
   determining that the difference is greater than zero; and
   transmitting the recommendation notification to the user device based on determining that the difference is greater than zero, wherein the difference is the amount of energy to be transferred to the vehicle battery.

4. The method of claim 1, wherein the second input comprises at least one of: a driver break schedule on the vehicle trip, an average driving speed and a historical driving pattern.

5. The method of claim 4 further comprising determining the time to charge the vehicle battery based on the driver break schedule for the vehicle trip.

6. The method of claim 1 further comprising:
   determining an SOC range associated with battery charging based on the information associated with vehicle battery charge rates with different battery SOC levels; and
   determining the time to charge the vehicle battery based on the SOC range.

7. The method of claim 1, wherein the third input comprises at least one of: locations of charging stations on the vehicle trip, locations of fleet designated charging stations, locations of charging stations closest to the vehicle, traffic condition, vehicle trip time duration, vehicle trip distance, road condition, and season or weather condition.

8. The method of claim 7 further comprising:
   determining a second distance between the vehicle current location and a charging station location on the vehicle trip;
   determining a third distance that the vehicle can travel based on the first input, the second input and the third input;
   comparing the second distance with the third distance; and
   transmitting an assistance notification to a server when the third distance is less than the second distance.

9. The method of claim 8 further comprising transmitting the charging station location to the user device when the third distance is greater than the second distance.

10. A system for providing electric vehicle charging recommendation, the system comprising:
   a transceiver configured to:
   receive a first input associated with a vehicle, a second input associated with a vehicle driver, and a third input associated with a vehicle trip, wherein the first input comprises a current state of charge (SOC) of a vehicle battery, information associated with vehicle battery charge rates for different battery SOC levels, vehicle and cargo weight, a vehicle type, and the vehicle current location;
   a processor communicatively coupled to the transceiver; and
   a memory for storing executable instructions, the processor configured to execute the instructions to:
      obtain the first input, the second input and the third input from the transceiver;
      determine a first distance to be travelled by the vehicle from a vehicle current location based on the third input, an average driving speed of the vehicle driver, and a remaining time of a working shift of the vehicle driver;
      determine an expected SOC required to travel the first distance from the vehicle current location based on the first input, the second input and the third input; and transmit a recommendation notification to a user device to charge the vehicle battery when the expected SOC is greater than the current SOC, wherein the recommendation notification comprises a time to charge the vehicle battery or an amount of energy to be transferred to the vehicle battery.

11. The system of claim 10, wherein the processor is further configured to:

determine a difference between the expected SOC and the current SOC;

determine that the difference is greater than zero; and transmit the recommendation notification to the user device based on a determination that the difference is greater than zero, wherein the difference is the amount of energy to be transferred to the vehicle battery.

12. The system of claim 10, wherein the second input comprises at least one of: a driver break schedule on the vehicle trip, an average driving speed and a historical driving pattern.

13. The system of claim 12, wherein the processor is further configured to determine the time to charge the vehicle battery based on the driver break schedule for the vehicle trip.

14. The system of claim 10, wherein the processor is further configured to:

determine an SOC range associated with battery charging based on the information associated with vehicle battery charge rates with different battery SOC levels; and determine the time to charge the vehicle battery based on the SOC range.

15. The system of claim 10, wherein the third input comprises at least one of: locations of charging stations on the vehicle trip, locations of fleet designated charging stations, locations of charging stations closest to the vehicle, traffic condition, vehicle trip time duration, vehicle trip distance, road condition, and season or weather condition.

16. The system of claim 15, wherein the processor is further configured to:

determine a second distance between the vehicle current location and a charging station location on the vehicle trip;

determine a third distance that the vehicle can travel based on the first input, the second input and the second input;

compare the second distance with the third distance; and transmit an assistance notification to a server when the third distance is less than the second distance.

17. The system of claim 16, wherein the processor is further configured to transmit the charging station location to the user device when the third distance is greater than the second distance.

18. A non-transitory computer-readable storage medium having instructions stored thereupon which, when executed by a processor, cause the processor to:

obtain a first input associated with a vehicle, a second input associated with a vehicle driver, and a third input associated with a vehicle trip, wherein the first input comprises a current state of charge (SOC) of a vehicle battery, information associated with vehicle battery charge rates for different battery SOC levels, vehicle and cargo weight, a vehicle type, and the vehicle current location, and wherein the second input includes an average driving speed of the vehicle driver and a remaining time of a working shift of the vehicle driver;

determine a first distance to be travelled by the vehicle from a vehicle current location, based on the third input and the second input;

determine an expected SOC required to travel the first distance from the vehicle current location based on the first input, the second input and the third input; and transmit a recommendation notification to a user device to charge the vehicle battery when the expected SOC is greater than the current SOC, wherein the recommendation notification comprises a time to charge the vehicle battery or an amount of energy to be transferred to the vehicle battery.

* * * * *